Aug. 22, 1967    V. GAVREAU ETAL    3,337,126
DUST EXTRACTION CENTRIFUGES
Filed Nov. 9, 1964    5 Sheets-Sheet 1

Inventors:
Vladimir Gavreau,
Albert Calaora,
and
Marcel Miane
BY Baldwin & Wight
Attorneys Aug. 22, 1967
V. GAVREAU ETAL
3,337,126
DUST EXTRACTION CENTRIFUGES
Filed Nov. 9, 1964
5 Sheets-Sheet 2
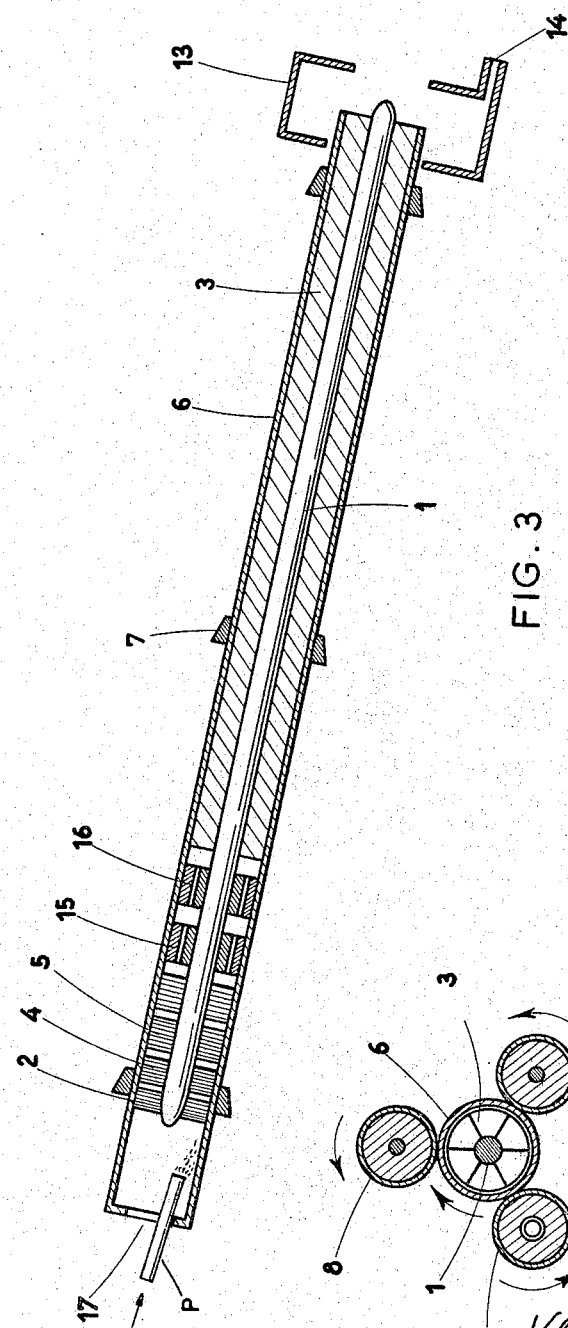
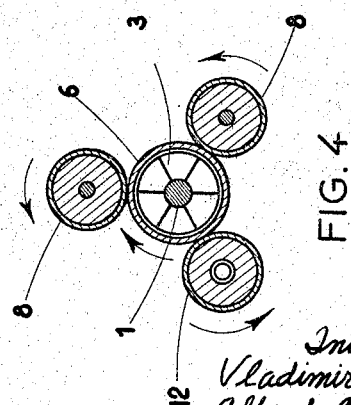
Inventors:
Vladimir Gavreau,
Albert Calaora,
and
Marcel Miane
BY Baldwin & Wight
Attorneys //united States Patent Office 3,337,126
Patented Aug. 22, 1967

3,337,126
DUST EXTRACTION CENTRIFUGES
Vladimir Gavreau, Albert Calaora, and Marcel Miane, Marseille, France, assignors to Établissement Public: Centre National de la Recherche Scientifique, Paris (Seine), France, a corporation of France
Filed Nov. 9, 1964, Ser. No. 409,740
Claims priority, application France, Nov. 14, 1963, 953,767
7 Claims. (Cl. 233—18)

ABSTRACT OF THE DISCLOSURE

This disclosure relates to dust extracting centrifuges, constructed of parts comprising an outer tube having a longitudinal axis and opposite inlet and outlet ends. An inner longitudinal body is disposed substantially concentrically within the outer tube, and spaced therefrom by radial blades connected to each of the inner body and the outer tube. Several series of the radial blades are utilized, each series including a plurality of blades arranged circumferentially about the inner body at a given angle with respect to the longitudinal axis of the tube, the angles of blades gradually decreasing toward the outlet end of the tube. The outer tube is driven by rotatable tires which comprise the sole lateral support of the tube, the tires contacting the tube on a surface thereof, or along predetermined paths. At least one tire is rotatably driven by a suitable motor, or the like. The outer tube may be disposed at an angle to the horizontal, and may also be provided with a water inlet. A plurality of centrifuges may be disposed in end-on-end relationship, and a dust collector may be provided at an outlet end thereof.

---

The present invention relates to dust extraction centrifuges, more particularly intended for the continuous removal of dust and like particles from a gas flow.

Dust-extraction centrifuges comprise a rotating assembly formed of an outer envelope surrounding an inner elongated body and providing around said body a free space through which extend radial, oblique blades which both propel the gas introduced at one end of the assembly and communicate thereto a rapid rotation movement whereby the dust particles or the like are centrifugally thrown towards the inner wall of the outer envelope and are collected laterally at the outlet of said envelope while the purified gas flow is extracted axially.

It is known that such dust-extraction centrifuges enable a much greater centrifugal force to be applied to the dust containing gases than do ordinary cyclones. Said centrifuges can even precipitate very fine dusts such as those which cause silicosis.

However, the vertical motion which occurs at the moment when the gas to be treated is suddenly driven along by the blades of the centrifuge considerably interferes with dust precipitation. Moreover, sufficient length of time must be given to allow for complete precipitation of the dust, which necessitates fairly long rotating tubes. It is very difficult to satisfactorily balance and center such a tube when it is carried by a very long shaft.

The main object of the present invention is to provide a centrifuge of the rapidly revolving partitioned tube type in which the gas under treatment is drawn along progressively, in a uniform flow along a sufficient length for dust and smoke to be precipitated.

According to the present invention gas is drawn along progressively by the use of a series of blades, which blades are gradually less and less inclined to the axis of rotation of the centrifuge from one series to the next in the direction of flow of the gas, the last blades being substantially parallel to the axis of rotation of the centrifuge. The successive blades are staggered in order to prevent undesirable rotary movements of the gas. Known devices, such as flux stabilizing gratings, may be used in conjunction with this system of progressive entrainment.

According to another feature of the invention the rotating tubes are not carried by a central shaft but on outer rollers or wheels. The peripheric speed of such a gas centrifuge is comparable to that of automobile wheels, so that it is possible to support such a rapidly rotating tube on automobile wheels having solid or even pneumatic tires. In the case of small centrifuges suitable for purifying air in hospitals, workshops etc., travelling wheels mounted on ball bearings are sufficient. It is possible to use solid or pneumatic rubber tires when the centrifuge is cooled by flowing water, as, for example, when a flow of water is used to remove the dust precipitated on the interior wall of the revolving tube. The revolving tube is then inclined in order to facilitate the flow of water. It is necessary to fit frusto-conical runways on the tube and frusto-conical tires on the rollers or wheels which bear the tube in rotation.

In the case of industrial centrifuges, intended for the precipitation of dust and other particles from flue gases, it may be advantageous to increase the said slope and even to use centrifuges with vertical axes, which allow an annular casing to be used to evacuate the dust. It is recommended that an ordinary cyclone should be employed to take out the largest particles from gas which is then treated by the dust-extracting centrifuge.

The absence of a central supporting shaft in this new type of centrifuge allows several centrifuges to be placed in series, if desired, the rotation speed of the successive centrifuges in such a series increasing from the first to the last centrifuge, each rotating more rapidly than the preceeding one. The absence of bearings supporting a central shaft avoids all causes of disturbance of the gas flow when it passes from one rotating section to the next rotating section. In this way a very progressive movement of the gas can be obtained according to the present invention.

Various embodiments of the invention are described hereinafter, reference being had to the appended drawings, in which:

FIG. 3 is a longitudinal sectional view of the centrifuge shown in FIG. 2;

FIG. 4 is a cross-sectional view of said centrifuge, showing how the bearing wheels are placed;

Figure 1:
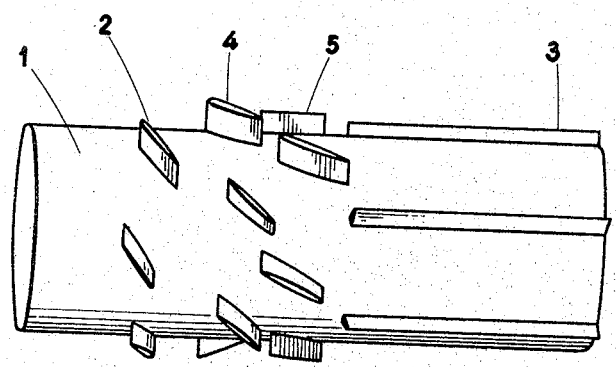
FIG. 1 is a diagrammatic, side elevational view of the rotating tube of a centrifuge according to the invention, showing how the blades are placed in order to ensure progressive movement of the gas.

For the sake of simplicity, in FIGURE 1, which shows how the blades are placed in order to ensure progressive movement of the gas, only the inner cylinder or tube onto which the said blades are secured is shown. Said cylinder 1 forms with an external, coaxial cylindrical envelope (not shown) a rotating annular volume which is subdivided into several parts or compartments by blades 2, 3, 4, 5. As can be seen from the figure, in which it is assumed that the gas circulates from left to right the successive blades 2, 4, 5 are gradually less and less inclined with respect of the longitudinal axis of cylinder 1, blades 3 provided in the last section forming partitions which are parallel to said axis. Blades 2, 4, 5, and partitions 3 are also staggered for the following reason: the peripheric speed of the inner cylinder 1 is less than that of the outer cylinder (not shown) covering the blades and the partitions; owing to the relative delay in the movement of the gas there is a risk of causing an extremely prejudical helical circulation in the compartments formed by the partitions 3. Experience shows that this phenomenon is practically eliminated when the blades are staggered, as shown at FIGURE 1.

Figure 2:
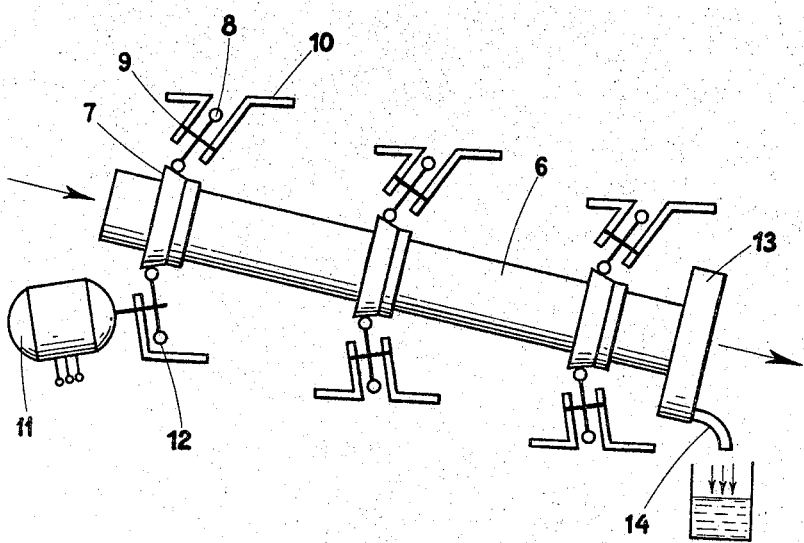
FIG. 2 is a diagrammatic, side elevational view of a small dust-removing centrifuge.

In the embodiment shown in FIGURES 2, 3 and 4, which relates to a small dust-removing centrifuge adapted to remove micro-organisms floating in the air and allergy-producing dusts in hospital wards, or to remove dust from the air in industrial workshops, an outer tube 6 made, for example of synthetic plastic material is provided with frusto-conical, aluminum alloy bearing rings 7 which form runways for rollers 8 rotatably mounted, for example by means of ball bearings on stationary spindles 9 which are carried by brackets 10. Rollers 8 are preferably provided with peripheral solid rubber tires. An electric motor 11 drives tube 6 by means of roller 12 which is similar to rollers 8 but is keyed on the shaft of the motor. The inner surface of the inclined rotating tube 6 is continuously cleaned by running water introduced through pipe P at the same time as the gas at the left end of the rotating tube through an inlet opening 17 shown in FIGURE 3. At the outlet of the centrifuge the dust-laden water is expelled radially and collected in an annular stationary casing 13, the gas passing out through a central hole in said casing (FIG. 3) and the dust-laden water being drawn off through a pipe 14.

An inner cylinder 1 provided with blades 2, 4, 5 and partitions 3 of the type shown in FIG. 1 is arranged within outer tube 6, said blades and partitions centering said cylinder 1 in said tube 6 and subdividing the annular space between cylinder 1 and tube 6 into independent compartments. Two flow stabilizing gratings 15 and 16 of the type used in wind tunnels for testing aeroplane models are placed between blades 2, 4, 5 on the one hand, and partions 3, on the other. The inclined blades 2, 4, 5 act as a suction pump for the gas introduced through opening 17.

Figure 5:
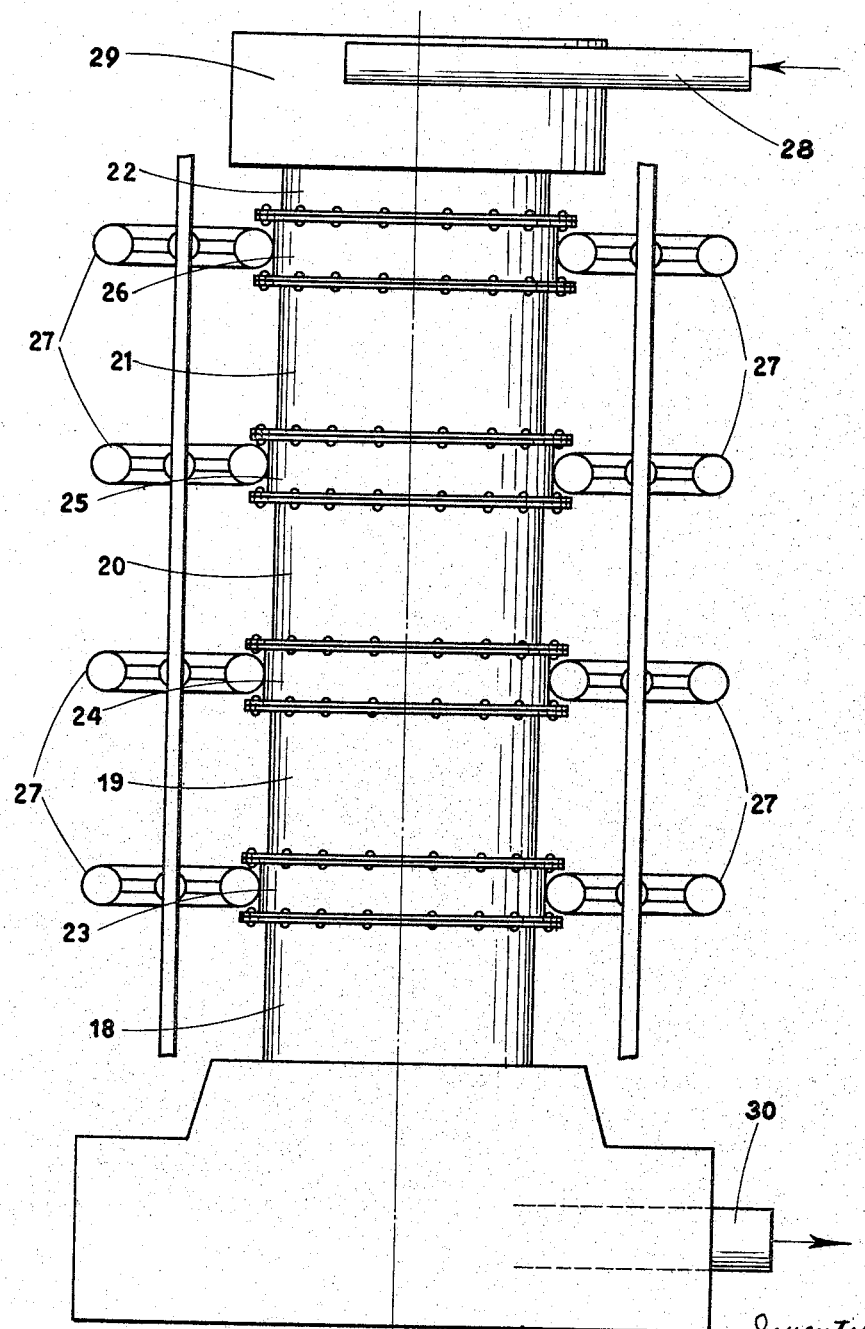
FIG. 5 is a side elevational view of a layer dust-removing centrifuge consisting of an assembly of multiple sections, connected by couplings which form runways for the horizointal wheels supporting the centrifuge.
Figure 6:
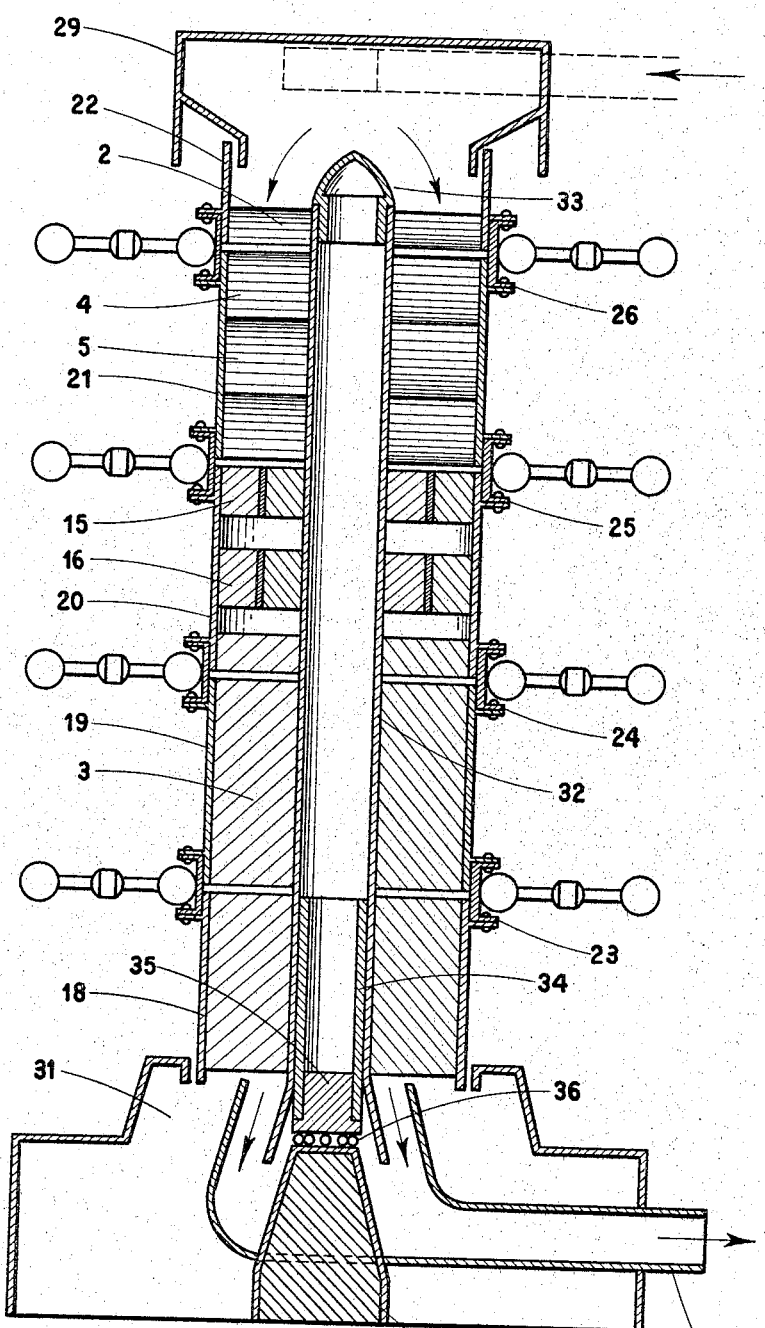
FIG. 6 is a longitudinal sectional view of the centrifuge shown in FIG. 5.

FIGURES 5 and 6 relate to a vertically arranged dust-removing centrifuge adapted to be used to remove dust, ashes and other particles from hot flue gases from industrial furnaces and the like. In said centrifuge the outer tube is formed of metal tube sections 18, 19, 20, 21 and 22 connected by connecting rings 23, 24, 25 and 26 which form runways for bearing wheels 27, said wheels in at least one vertical series being keyed on a common shaft driven by an electric motor (not shown). The dust-laden gas arrives tangentially by a pipe 28 into a stationary upper casing 29 while the dust-free gas is evacuated by pipe 30. Sections 18, 19, 20, 21, and 22 may be made of steel coated internally with a suitable protective coating and painted externally, or of a suitable metal which is not attacked by the gases and dusts treated. Connecting rings 23, 24, 25 and 26 are made of metal and the sections are connected with the couplings by flanges on the couplings and sections.

A tube 32 is held coaxially within tube 18–22 by means of staggered less and less progressively inclined blades 2, 4 and 5 and longitudinal partitions arranged as shown at FIGURE 1, and flow-stabilizing gratings 15 and 16 are arranged between blades 5 and partions 3, members 2, 4, 5, 3, 15 and 16 allowing the dust-laden gas to be driven along progressively and with a regular movement. The clean gas is evacuated by pipe 30, whilst the dust falls into an annular hopper 31. The inner tube 32 has a rounded hood 33 and is supported by a tube 34 forced into tube 32 and closed by a cylinder 35 which rests on a thrust ball-bearing 36 placed on a base 37, to support the rotating tube assembly.

Figure 7:
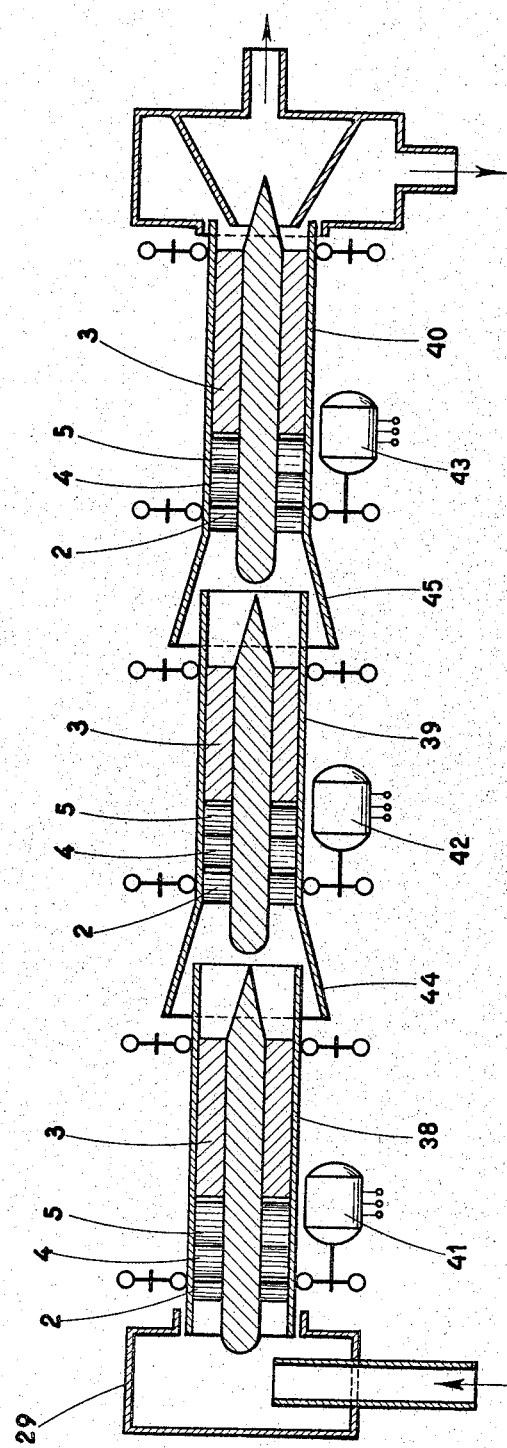
FIG. 7 is a diagrammatic, longitudinal, sectional view of a multiple centrifuge with successive sections revolving at different speeds.

A plurality of successive centrifuges may be used in series as shown in FIGURE 7, in order to ensure a still more progressive movement of gas and obtain high speeds of rotation without disturbing the flow by too sudden changes in the speed of rotation.

Three centrifuges 38, 39 and 40 arranged in series are driven at different speeds by the three electric motors 41, 42, and 43 respectively. Motor 41 is the slowest, motor 42 runs faster than motor 41 and motor 43 is the fastest. The gas to be treated arrives in the first centrifuge 38 through the casing 29. When it leaves said first centrifuge it then enters the following centrifuge 39, which rotates at a higher speed, through a flaring end 44 of the outer tube thereof. In the same manner, when it leaves said second centrifuge the gas which undergoes a rapid rotation enters the third centrifuge 40, which rotates at a still higher speed, through the flaring end 45 of the outer tube thereof.

It should be noted that the special manner in which blades 2, 4, 5 and partitions 3 are placed produces a suction effect which is all the greater the faster the speed of rotation. Thus all the gas leaving the first centrifuge is collected by the following, and so on.

Three centrifuges in series are shown in FIGURE 7 but two only, or more than three could be used. However, it is generally sufficient, whether in the case of small centrifuges for cleansing air or for large centrifuges for industrial dust extraction and smoke suppression, to use only one centrifuge.

What we claim is:

1. A centrifuge for separating dust and like particles from a flow of gas, comprising an outer tube having a longitudinal axis, an inlet open end and an outlet open end opposite said inlet end, an inner, elongated body arranged substantially axially within said outer tube and having an outer diameter providing a free space between said outer tube and said inner body, at least three series of substantially radial blades extending from said inner body to said outer tube across said free space, each said series of blades comprising a plurality of blades arranged circumferentially about said inner body at a given angle with respect to said longitudinal axis of said outer tube, said angle decreasing from the series adjacent said inlet end to the said series adjacent said outlet end in which latter series said angle is zero, means for supporting said outer tube for rotation about its longitudinal axis, said supporting means also comprising a driving means whereby said inner body is driven through said blades, and means around said outlet open end for laterally collecting the separated dust and like particles and for the axial exit of the gas.

2. A centrifuge for separating dust and like particles from a flow of gas, comprising an outer substantially cylindrical tube having an inclined longitudinal axis, an upper inlet open end and a lower outlet open end opposite said inlet end, an inner, substantially cylindrical elongated body arranged substantially axially within said outer tube and having an outer diameter providing a free space between said outer tube and said inner body, at least three series of substantially radial blades extending from said inner body to said outer tube across said free space, each said series of blades comprising a plurality of blades arranged circumferentially about said inner body at a given angle with respect to said longitudinal axis of said outer tube, said angle decreasing from the series adjacent said inlet end to the said series adjacent said outlet end in which latter series said angle is zero, at least two bearing tracks around said outer tube, a plurality of supporting rollers for said tracks providing the entire lateral support for said outer tube, at least one roller in said series providing means for rotating said outer tube and being adapted to be driven in rotation by a power source, and means around said outlet open end for laterally collecting the separated dust and like particles and for the axial exit of the gas.

3. The centrifuge of claim 2 in which the longitudinal axis of the outer tube is vertical.

4. The centrifuge of claim 2, in which the rollers are provided with peripheral rubber tires.

5. A centrifuge for separating dust and the like particles from a flow of gas, comprising an outer substantially cylindrical tube having an inclined longitudinal axis, an upper inlet open end and a lower outlet open end opposite said inlet end, an inner, substantially cylindrical elongated body arranged substantially axially within said outer tube and having an outer diameter providing a free space between said outer tube and said inner body, at least three series of substantially radial blades extending from said inner body to said outer tube across said free space, each said series of blades comprising a plurality of blades arranged circumferentially about said inner body at a given angle with respect to said longitudinal axis of said outer tube, said angle decreasing from the series adjacent said inlet end to the said series adjacent said outlet end in which latter series said angle is zero, at least two bearing tracks around said outer tube, a plurality of supporting rollers for said tracks providing the only lateral support for said outer tube, at least one roller in said series providing means for rotating said outer tube and being adapted to be driven in rotation by a power source, means for introducing water within said free space between said outer tube and said inner body, and means around said outlet open end for laterally collecting the water and separated dust and like particles and for the axial exit of the gas.

6. A centrifuge for separating dust and like particles from a flow of gas, comprising an outer substantially cylindrical tube having a vertical longitudinal axis, an upper inlet open end and a lower outlet open end opposite said inlet end, an inner, substantially cylindrical elongated body arranged substantially axially within said said outer tube and having an outer diameter providing a free space between said outer tube and said inner body, at least three series of substantially radial blades extending from said inner body to said outer tube across said free space, each said series of blades comprising a plurality of blades arranged circumferentially about said inner body at a given angle with respect to said longitudinal axis of said outer tube, said angle decreasing from the series adjacent said inlet end to the said series adjacent said outlet end in which latter series said angle is zero, at least two bearing tracks around said outer tube, a plurality of supporting rollers for said tracks providing the only lateral support for said outer tube, at least one roller in said series providing means for rotating said outer tube and being adapted to be driven in rotation by a power source, and means around said outlet open end for laterally collecting the separated dust and like particles and for the axial exit of the gas.

7. A dust separating apparatus for removing dust and like particles from a flow of gas comprising at least two separating units, each of said units comprising an outer substantially cylindrical tube having a longitudinal axis, an inlet open end and an outlet open end opposite said inlet end, an inner, substantially cylindrical elongated body arranged substantially axially within said outer tube and having an outer diameter providing a free space between said outer tube and said inner body, at least three series of substantially radial blades extending from said inner body to said outer tube across said free space, each said series of blades comprising a plurality of blades arranged circumferentially about said inner body at a given angle with respect to said longitudinal axis of said outer tube, said angle decreasing from the series adjacent said inlet end to said series adjacent said outlet end in which latter series said angle is zero, means in engagement with said outer tube for supporting said outer tube rotatingly about said longitudinal axis, and means operatively connected to said supporting means for driving said outer tube in rotation about said axis at speeds which increase from one unit to the adjacent unit, said separating units being arranged substantially coaxially in immediate succession with the outlet open end of one unit engaged in the inlet open end of the adjacent unit, and means around the said outlet open end of the ultimate separating unit for laterally collecting the separated dust and like particles and for the axial exit of the gas.

References Cited

UNITED STATES PATENTS

| | | | |
|---|---|---|---|
| 859,427 | 7/1907 | Brandenburg | 233—13 X |
| 1,061,656 | 5/1913 | Black | 233—28 X |
| 1,530,758 | 3/1925 | Coleman | 233—18 X |
| 1,861,878 | 6/1932 | Quiroz | 233—25 |
| 2,085,538 | 6/1937 | Lyons | 233—18 |
| 2,765,979 | 10/1956 | Boestad et al. | 233—7 X |
| 2,804,163 | 8/1957 | Bullock et al. | 55—242 |
| 2,936,948 | 5/1960 | Eck | 230—120 |
| 3,276,679 | 10/1966 | Booth | 233—28 X |

M. CARY NELSON, *Primary Examiner.*

H. T. KLINKSIEK, *Assistant Examiner.*